United States Patent [19]

Aldrich

[11] Patent Number: 4,953,675

[45] Date of Patent: Sep. 4, 1990

[54] SIMPLY SUPPORTED SECONDARY SHAFTING SYSTEM TORQUE SENSOR

[75] Inventor: Allyn M. Aldrich, Rockford, Ill.

[73] Assignee: Sundstrand Corporation, Rockford, Ill.

[21] Appl. No.: 297,322

[22] Filed: Jan. 17, 1989

[51] Int. Cl.$^5$ ............................................. F16D 43/22
[52] U.S. Cl. .................................... 192/8 R; 192/141
[58] Field of Search ............... 192/7, 8 R, 30 W, 134, 192/141, 143; 188/134

[56] References Cited

U.S. PATENT DOCUMENTS

| | | | |
|---|---|---|---|
| 877,714 | 1/1908 | Heermans | 192/8 R |
| 945,406 | 2/1909 | Nelson et al. | 192/141 |
| 1,283,386 | 10/1918 | Wenzelmann | 192/141 |
| 2,620,911 | 12/1952 | Krell | 192/141 |
| 2,837,925 | 6/1958 | Rowley | 192/141 |
| 2,902,876 | 7/1959 | Pollock | 192/141 |
| 3,221,118 | 11/1965 | Hoover | 192/141 |
| 3,249,191 | 5/1966 | Helms | 192/143 |
| 4,337,868 | 7/1982 | Gattu | 212/267 |
| 4,381,166 | 4/1983 | Smart | 414/685 |
| 4,597,480 | 1/1986 | Schwarz | 192/54 |

OTHER PUBLICATIONS

L.E. Froslie et al., Automatic Transmission Friction Elements, 1962, 106.

Primary Examiner—Allan D. Herrmann
Assistant Examiner—Nicholas Whitelaw
Attorney, Agent, or Firm—Antonelli, Terry, Stout & Kraus

[57] ABSTRACT

A torque sensor (10) is provided which avoids the problems of cantilevered screw and nut arrangements previously used in torque sensors. A long gear (15) receives a torque input from a shaft (14) of a primary shafting system (11) used to actuate various devices and the like (A,B,C,D,E). The long gear (15) is simply supported between bearings (17,18) to eliminate cantilevered support. Likewise, a threades shaft (19) receiving a torque input from shaft (13) of the primary shafting system (11) is simply supported between bearings (20,21) and has a travelling gear (22,23) threadably mounted thereon for axial movement along the shaft (19) as a result of differential motion between the long gear (15) and the travelling gear (22,23). Mating conical surfaces (24,26 and/or 25,27) are provided respectively on the travelling gear (22,23) and shaft (19) to cause locking and effect torque transmissions between the shafts (13,14). Alternatively, a conical surface 24') and a capstan spring (29) effect locking between the travelling gear (22,23) and the shaft (19) or form-locking dogs (32,33) can be utilized to effect torque transmission and bring about a back-up shafting system into operation. A sensing device (31) can be provided to detect movement of the travelling gear (22,23) sufficient to alert an operator.

16 Claims, 1 Drawing Sheet

SIMPLY SUPPORTED SECONDARY SHAFTING SYSTEM TORQUE SENSOR

TECHNICAL FIELD

The present invention relates to a torque sensor with positive shaft locking. More particularly, the present invention concerns a differential motion mechanism which acts as a torque sensor and avoids the problems of previous torque sensors which use cantilevered screw and nut arrangements operating at high rotational speed.

BACKGROUND ART

A torque sensor is used primarily to detect the transmission of torque through a shafting system. The sensor is utilized in those situations where a torque is being delivered through one loaded set of shafts with a backup set of shafts which are in an unloaded condition. This redundant system has particular applicability in aerospace applications where failure of a primary system, for example, actuation of flight controls, is unacceptable without a backup system to take over torque transmission for actuating on-board systems. Thus, when the primary shafting system fails, the load must be reliably transferred to the secondary shafting system. The torque sensor is critical for advising the system operator that the second shafting system is now carrying a load and that there has been a failure in the primary system.

In the past, several devices have been available to perform a torque sensing function. One such device is a positive engagement torque sensor shown in U.S. Pat. No. 4,597,480. Although such systems have been generally acceptable, they also have characteristic problems which inhibit their ability to function under extreme circumstances such as in high speed shafting systems.

For example, prior art devices have utilized a cantilevered screw and nut arrangement, located in the secondary load path or secondary set of shafts to perform the torque sensing function. Essentially such an arrangement consists of a screw connected to one of the shafts in the secondary load path. This screw is threadably associated with a nut connected to a separate shaft in the secondary load path. When the screw/nut arrangement is allowed to rotate freely no torque can be transmitted across the secondary load path. Typically, the secondary load path shafting will operate at speeds between 1,000 and 18,000 rpm. The secondary shafting system is normally driven by the primary system through transfer gearboxes and creates a complete loop of shafting from the primary drive source through the actuator system and back into the primary drive source, except for the torque sensing device which makes it an open loop during normal operation. In the event that there is an interruption in the primary drive shafting system by way, for example, of a break in the primary drive shaft itself, there will be created a differential motion between the screw and the nut by virtue of one member, either the screw or the nut, continuing to be driven by the intact portion of the primary drive shaft and the other member remaining stationary or being backdriven by the load on the interrupted shafting. As the nut rotates relative to the screw, relative translation between the screw and the nut occurs. As soon as the nut has reached an end stop position on the screw and translation is stopped torque transmission occurs and torque is transmitted through the nut to the screw causing the non-rotating shaft to now be rotated in a controlled manner and being driven off the intact portion of the primary shafting system. A conventional switch arrangement is provided to detect the translation of the nut along the screw caused by the differential rotation of the two secondary load path shafts so as to indicate that the back-up system is transmitting torque load from the primary drive system. The use of the secondary load path prevents any serious structural interruption of the primary shafting system from causing an interruption of the system operation and allows the overall system to continue to function in a normal manner which prevents what could otherwise result in disastrous consequences.

However, in arriving at the present invention, it has been found that when the secondary drive shaft is operating at high speeds, i.e. in the 5,000 rpm range, the unbalanced mass on a cantilevered screw and nut arrangement can result in large oscillatory motion and greater instability during operation which could result in false torque indication and/or premature failure of the sensor.

Moreover, prior torque sensors had lost motion (or dead band) required for sensing motion as the arrangement was moved through the dead band area. Thus, each time torque is reversed on the shaft system the torque sensor elements will have lost motion before transmitting torque to the opposite shaft. Although lost motion during reversing operations is not always a significant disadvantage, it can result in significant position error of elements being driven by the shaft in critical systems.

Threaded mechanisms which produce differential motion between parts are, of course, generally well known. For example, U.S. Pat. No. 4,337,868 shows a telescopic crane boom having rotatable extending, retracting screws which utilize a hollow base section, a hollow intermediate section telescoped within the base section and a hollow fly section telescopable within an intermediate section. Rotatable screws are provided within the boom and are driven simultaneously to effect axial extension of the boom sections. Such an arrangement is not concerned with the problems encountered in high speed torque sensors in which the problems of cantilevering of the screw and nut arrangement can result in catastrophic failure.

Likewise, U.S. Pat. No. 4,381,166, discloses a fork unit having adjustable forks in which rotatably supported threaded rods are provided and carry an elongated nut so that upon rotation of the threaded rods the elongated nuts move axially upon the rods causing desired movement of forks toward or away from each other. Again, such a mechanism is not concerned with the problems encountered in torque sensor applications and does not suggest anything to solve those problems.

SUMMARY OF THE INVENTION

The present invention has the object of overcoming the problems and disadvantages encountered in prior art torque sensors which use a cantilevered screw and nut arrangement.

The present invention has the further object of overcoming problems and disadvantages encountered in previous torque sensors which used a cantilevered screw and nut arrangement and providing a mechanism to positively lock the two drive shaft elements together once a failure has occurred. Prior torque sensors do not eliminate the lost motion or dead band required for sensing once the unit moves through the dead band area. This means that each time torque is reversed on the shaft system the torque sensor elements will move through a dead band before transmitting that torque to the opposite shaft in most systems. The fact that a dead band exists continually during reversing operations is not always a significant disadvantage. However in more critical systems this dead band can result in significant position error of the elements being driven by the shaft.

It is an object of the present invention to provide a mechanism for positively locking two drive shaft driven elements together unlike prior torque sensors that required a free play or deadband, i.e. an amount of play during which nothing happens in a deadband area and no action is initiated to actuate the backup drive system, when a direction is reversed through shafting.

It is an object of the present invention to provide a torque sensor mechanism with positive shaft locking and simply supported shafts which eliminate problems of mass imbalances and false torque indications.

The foregoing objects have been achieved by providing a torque sensor consisting of a long gear constituting one of the second shafting system inputs mounted on a shaft that is simply supported by bearings on both ends rather than in a cantilever manner at one end. Another secondary shaft system input is constituted by a threaded shaft member mounted on bearings at both ends (i.e., again it is simply supported) of the shaft. A nut whose outside diameter is provided with gear teeth is mounted on the threaded shaft member and mates with the long gear on the first shaft. Rotation of the two shafts at equal speeds in opposite directions when the primary shafting system operates normally causes no translation of the nut/gear arrangement. However, differential motion of the nut relative to the long gear will occur when the torque carried through the system by, for example, failure of primary drive shaft system causes a difference in rotational speed between the long gear and the threaded shaft. This differential rotation causes the nut to translate along the screw member.

It is within the scope of the present invention to use a primary shaft operation wherein the inputs to the long gear and the threaded shaft are in opposite directions thereby eliminating the idler gear between the travelling gear and the long gear.

Sensing of the translational motion of the nut is accomplished through a proximity switch or a micro switch of known construction.

The foregoing arrangement has the advantage of solving the problems of oscillatory action or whipping encountered in known cantilevered shafts.

The foregoing arrangement in accordance with the present invention also has the advantage of locking of the two shafts together without lost motion through the use of a cone friction jamming brake with the cone angles designed such that the axial force on the nut generated by travelling down the screw threads is sufficient to wedge the cones together to provide a very high torque resistance.

In another embodiment of the present invention, the outer surface of cylinders attached to the travelling gear can have a slight taper. As a result, as the travelling gear rotates into an end stop position, it comes into the internal diameter of a helical spring that is attached on one end to a fixed portion of the bearing of the threaded shaft. As the taper diameter comes into the spring, the spring is compressed and opens circumferentially to allow the cylinder to enter further into the spring. As torque is reversed on this member, the spring tightens down on the cylinder with a capstan effect thereby locking the screw to the nut and preventing it from backdriving down the screw thread and producing lost motion.

BRIEF DESCRIPTION OF THE DRAWINGS

These and further features, objects and advantages of the present invention will become more apparent from the following detailed description of the present invention when taken in conjunction with the accompanying wherein.

BEST MODE FOR CARRYING OUT THE INVENTION

Figure 1:
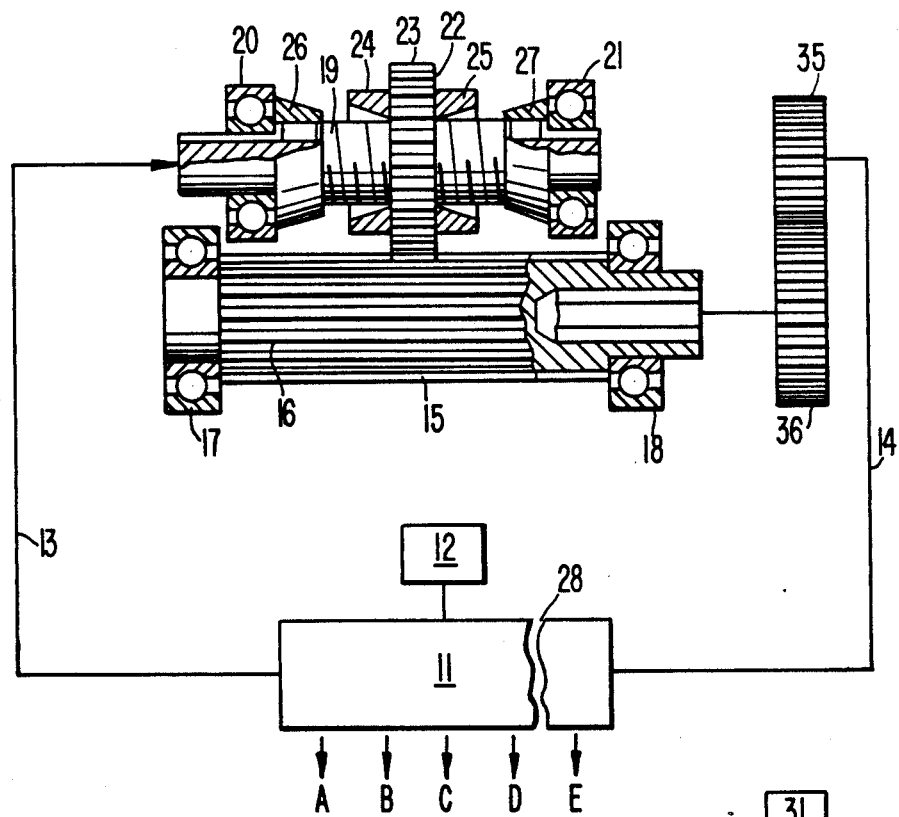
FIG. 1 is a view of the torque sensor in accordance with the present invention as located in a system schematically shown.

Referring now to the drawings and, in particular to FIG. 1, there is shown an improved torque sensor designated generally by the numeral 10 in accordance with the present invention. The torque sensor 10 is used in a secondary drive shaft system 13,14 which is driven by the primary drive shaft system 11 actuated by driver mechanism 12. The primary drive shaft system 11 actuates one or more systems A,B,C,D and E shown by the output arrows. A detailed discussion of the primary drive shaft system, the drive mechanism 12 and the output actuation A-E need not be described in further detail because it is well known and does not form a part of the present invention. Secondary drive shaft 13 shown schematically in FIG. 1 is attached to an input of the torque sensor 10. Similarly, secondary drive shaft 14 drives an idler gear 35 which meshes with another gear 36 rotatably fixed to a shaft 15 of torque sensor 10 as schematically shown in FIG. 1. The shaft 15 is an elongated shaft which has gear teeth 16 on its periphery The long gear 15 is rotatably mounted in conventional bearings 17,18 so as to be simply supported between the bearings. A threaded shaft 19 is connected to the secondary drive system shaft 13 and is simply supported between conventional bearings 20,21.

A travelling member 22 is threadably mounted on threaded shaft 19 so as to be movable along the length of threaded shaft 19 as hereinafter explained. The travelling member 22 also has gear teeth 23 on its outer periphery which mesh with the gear teeth 16 of long gear shaft 15. The gears are so sized that as long as the primary drive shaft system 11 is operating normally and the secondary drive system shafts 13,14 are rotating at normal speeds, the travelling member 22 and the long gear 15 rotating without causing any differential rotation between the travelling member 22 and the threaded shaft 19. It is within the scope of the present invention that the system could have the shafts 13 and 14 operating in different rotational directions by eliminating the idler gears 35,36.

The travelling gear member 22 is provided with female friction locking cones 24,25 on each end face thereof. Respective mating cones 26,27 are fixed to the threaded shaft 19 shouldered against the bearings 20, 21, respectively and are designed to provide a friction lock between one set of the cones so that the shafts are rotationally locked together.

Figure 3:
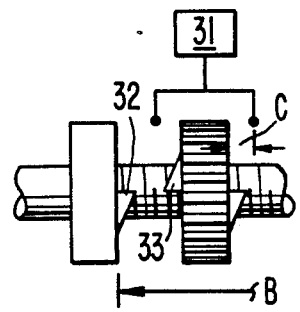
FIG. 3 is another isolated portion of the torque sensor similar to that of FIG. 1 but showing dog stops instead of cones if lost motion is acceptable after the torque sensor has tripped a switch.
Figure 2:
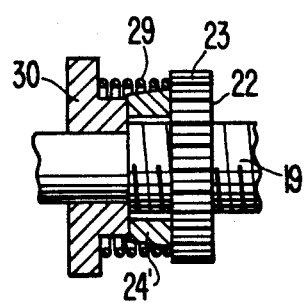
FIG. 2 is an isolated portion of the torque sensor similar to that of FIG. 1 but showing another embodiment of the present invention using a helical spring to achieve the capstan effect for locking the screw to the nut to prevent backdriving down the screw thread.

In the event of a malfunction of the primary drive shaft system such as breakage designated by the numeral 28 in FIG. 1, the secondary drive system shaft 14 will stop rotating completely or will have a reduced speed while the secondary drive system shaft 13 continues to rotate at normal speed. As a result, the travelling gear member 22 will be driven along the threaded shaft 19 as a result of the abnormal differential speed between the threaded shaft 19 and the travelling member 22. When the travelling member 22 moves either rightwardly or leftwardly, the respective female cone portion 24,25 will engage axially with either of the male cone portions 26,27 to provide rotational friction locking and a smooth transition of the torque from the primary shafting system to the secondary or back-up drive system. Proximity switches or micro switches of the type designated by the numeral 31 in FIG. 3, are arranged so as to be actuated by the movement of the travelling gear member 22 to a desired position. Alternatively, the switches could be arranged so that they are mechanically or magnetically tripped upon the engagement of the cones 24,26 or 25,27 in a well known manner which need not be shown. Moreover, a single switch over the travelling gear member 22 can detect movement away from the center position shown in FIG. 1 without any contact such as by way of a proximity switch.

If lost motion between the shafts 13,14 is acceptable after the torque sensor has tripped the switch and activated the back-up system, dog stops can be used in lieu of the cones 24,26 or 25,27. It will also be appreciated that the proximity switches or micro switches will pick up movement of the travelling gear 22 with movements greater than about 0.1 inch in either direction.

In lieu of the cone arrangement shown in FIG. 1, the present invention also contemplates the use of a capstan spring 29 arrangement wound concentrically around a flanged member 30 at the end of the shaft 19. When the male cone member 24 travels to the left and pushes against the capstan spring 29 as it enters the latter, it causes the spring to expand in circumference. The cone 24' and spring 29 are sized so that the spring 29 wraps tightly about the cone 24' preventing it from backing out of the stop position after the cone 24' has completed travel as far to the left as possible. It will be appreciated that a similar arrangement can be provided at the other end of shaft 19 if another male cone member is provided on the opposed end face of the travelling gear member 22. In that case, the winding of the capstan spring on the other end of the shaft 19 will have to be oppositely wound to the spring 29 to prevent the travelling gear member 22 from backing out.

The torque sensor in accordance with the present invention provides jamming with lock-up, if desired, after the primary shafting system encounters a problem in carrying the load. It also allows motion of the torque sensor without load carrying and without the vibration encountered in prior art torque sensors. In other words, the present invention provides a stable, repeatable motion sensing device that will allow motion without carrying load and will also carry load with lock-up after load carrying commences. It further provides a reliable differential motion sensor to indicate presence or absence of torque on a secondary shaft. The torque sensor accomplishes such failure indication by some movement without full engagement. Yet, it can also be used with a non-jamming stop such as a dog stop if lost motion is acceptable after tripping of the switch. In any case, the present invention permits some movement to indicate failure without having to lock-up or fully engage.

While several embodiments of the present invention have been shown and described, it should be clear to one skilled in the art in light of the foregoing that the invention is susceptible of changes and modifications without departing from the scope of the invention. Therefore, it is not intended that the invention be limited to the details shown and described herein but that it encompass all changes and modifications as fall within the scope of the appended claims.

I claim:

1. A torque manner in a secondary shafting system operatively associated with a primary shafting system, comprising:

a first rotatable shaft simply supported between bearings and receiving a first torque input from the secondary shafting system;

a second rotatable shaft simply supported between bearings and receiving a second torque input from the secondary shafting system;

a threaded portion being associated with said first rotatable shaft;

a first gear threadably mounted on said threaded portion for axial movement along said first rotatable shaft;

a second gear associated with said second rotatable shaft and in meshing engagement with said first gear throughout the axial movement of said first gear as a result of differential motion between said first and second rotatable shafts when torque is transmitted between said first and second shafts resulting from different first and second torque inputs thereto, wherein said differential motion does not occur when said first and second torque inputs are the same and the primary and secondary shafting systems are rotating at normal speeds; and means for causing friction is jamming between said first gear and said first rotatable shaft at an end of said first rotatable shaft, whereby the simply supported first and second rotatable shafts minimizes oscillatory motion and premature failures of the torque sensor.

2. A torque sensor according to claim 1, further including means for sensing translation of said first gear and transmitting a signal representative of said translation.

3. A torque sensor according to claim 1, wherein said friction jamming means comprises a female conical member fixed to one of said first gear and said first rotatable shaft, and a male conical member adapted to mate with and frictionally engage said female conical member on the other of said first gear and said first rotatable shaft.

4. A torque sensor according to claim 3, further including means for sensing translation of said first gear and transmitting a signal representative of said translation.

5. A torque sensor according to claim 1, wherein said friction jamming means comprises female conical members fixed to each side of one of said first gear and said first rotatable shaft, and male conical members adapted to mate with and frictionally engage respective said female conical members on each side of the other of said first gear and said first rotatable shaft.

6. A torque sensor according to claim 5, further including means for sensing translation of said first gear and transmitting a signal representative of said translation.

7. A torque sensor according to claim 1, wherein means is provided for preventing relative movement between said first gear and said first rotatable shaft at an end of said first axial shaft.

8. A torque sensor according to claim 7, further including means for sensing translation of said first gear and transmitting a signal representative of said translation.

9. A torque sensor according to claim 1, wherein means is provided for causing locking between said first gear and said first rotatable shaft.

10. A torque sensor according to claim 9, wherein said locking means comprises at least one dog on said first gear and on said first rotatable shaft arranged to abut each other for providing torque transmission through the shafting system.

11. A torque sensor according to claim 10, further including means for sensing translation of said first gear and transmitting a signal representative of said translation.

12. A torque sensor for a shafting system, comprising:
a first rotatable shaft simply supported between bearings and receiving a first torque input from the shafting system;
a second rotatable shaft simply supported between bearings and receiving a second torque input from the shafting system;
a threaded portion being associated with said first rotatable shaft;
a first gear threadably mounted on said threaded portion for axial movement along said first rotatable shaft;
a second gear associated with said second rotatable shaft and in meshing engagement with said first gear throughout the axial movement of said first gear as a result of differential motion between said first and second rotatable shafts when torque is transmitted between said first and second shafts resulting from different torque inputs thereto; and
means for preventing relative movement between said first gear and said first rotatable shaft at an end of said first axial shaft, wherein said movement preventing means comprises a male conical member fixed to one of said first gear and said first rotatable shaft, and a capstan spring fixed to the other of said first gear and said first rotatable shaft for receiving said male conical member therein and thereafter preventing said male conical member from rotating relative to and thereby moving axially away from said capstan spring.

13. A torque sensor according to claim 12, further including means for sensing translation of said first gear and transmitting a signal representative of said translation.

14. A torque sensor for a shafting system, comprising
a first rotatable shaft simply supported between bearings and receiving a first torque input from the shafting system;
a second rotatable shaft simply supported between bearings and receiving a second torque input from the shafting system;
a threaded portion being associated with said first rotatable shaft;
a first gear threadably mounted on said threaded portion for axial movement along said first rotatable shaft;
a second gear associated with said second rotatable shaft and in meshing engagement with said first gear throughout the axial movement of said first gear as a result of differential motion between said first and second rotatable shafts when torque is transmitted between said first and second shafts resulting from different torque inputs thereto; and
means for preventing relative movement between said first gear and said first rotatable shaft at an end of said first axial shaft, wherein said movement preventing means comprises male conical members fixed to each side of one of said first gear and said first rotatable shaft, and capstan springs fixed to each side of the other of said first gear and first rotatable shaft for receiving respective ones of said male conical members therein and thereafter preventing the receiving conical member from rotating relative to and thereby moving axially away from the receiving one of said capstan springs.

15. A torque sensor according to claim 14, wherein said capstan springs are wound opposite to each other.

16. A torque sensor according to claim 14, further including means for sensing translation of said first gear and transmitting a signal representative of said translation.

* * * * *